Figure 1:
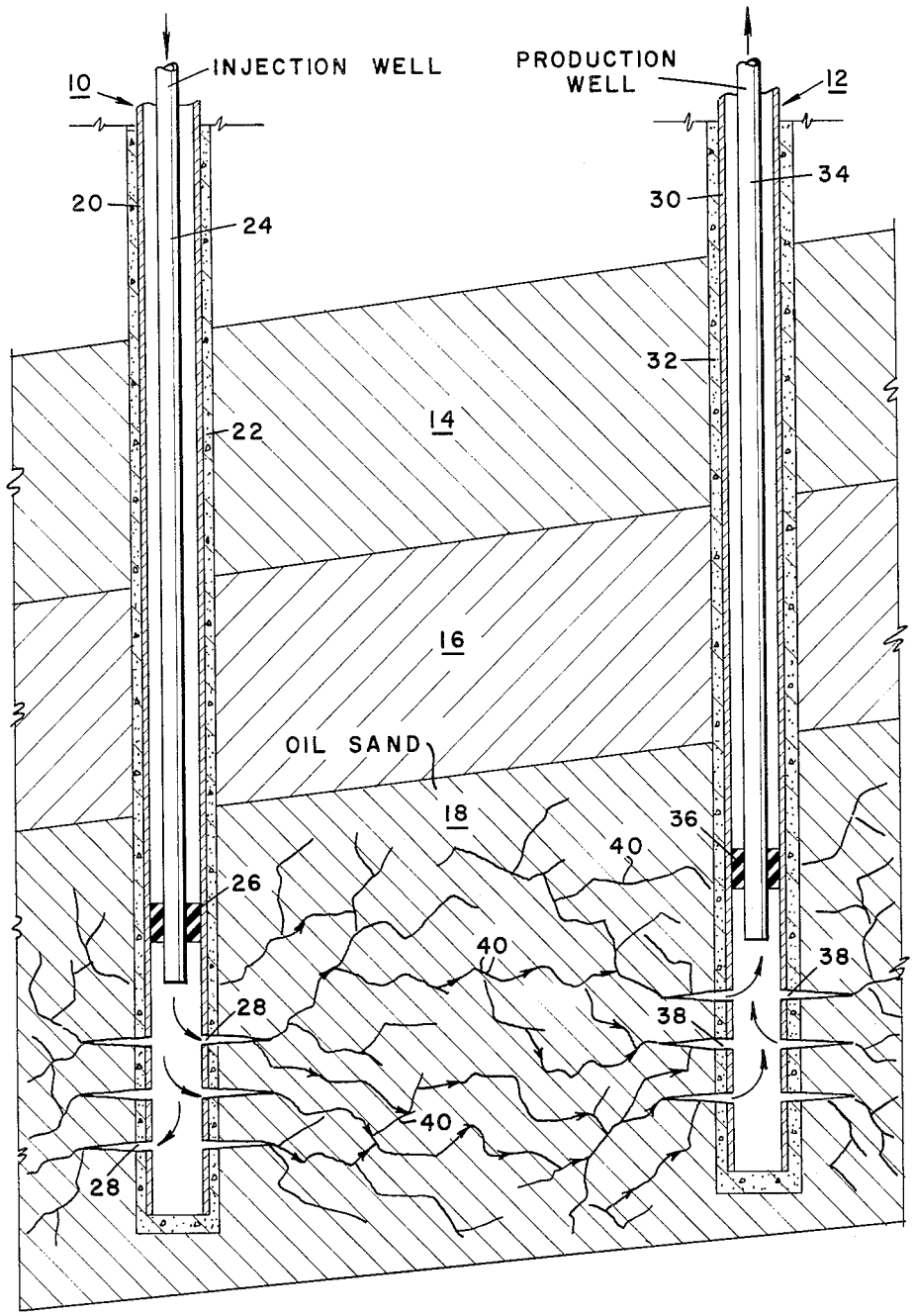

INVENTOR.
JOSEPH G. RICHARDSON,
BY Frank S. Troidl
ATTORNEY.

United States Patent Office 3,138,204
Patented June 23, 1964

3,138,204
METHOD OF IMPROVING INJECTIVITY OF
WATER-SOLVENT MIXTURES
Joseph G. Richardson, Houston, Tex., assignor, by mesne
assignments, to Jersey Production Research Company,
Tulsa, Okla., a corporation of Delaware
Filed July 29, 1959, Ser. No. 830,318
2 Claims. (Cl. 166—42)

This invention relates to the production of oil. More particularly, this invention relates to the production of oil by the injection of a water-solvent mixture into a first well to displace the oil contained in a subterranean oil reservoir. The displaced oil is produced from a second well.

One method of recovering oil contained in a subsurface formation is by displacing the oil by water-solvent mixtures. The solvent may be any one of, or a mixture of, liquid or gaseous hydrocarbons having from one carbon atom to four carbon atoms. For example, the solvent may be liquid propane, methane enriched with liquid propane, or methane at very high pressures, say 3000 p.s.i. or above.

In the process of obtaining oil by displacing the oil with a water-solvent mixture, the volume ratio of water to solvent of the mixture is chosen such that the rate of flow of the water and the rate of flow of the solvent through the oil-containing subterranean formation is substantially the same. Thus, the water and solvent are substantially uniformly distributed and the water front and the solvent front remain substantially the same since they are both progressing through the subsurface oil-containing formation at substantially the same rate.

The "injectivity" or the easiness with which the water-solvent mixture can be injected into the subsurface formation is determined, among other things, by the relative permeability of the subsurface formation to the solvent, the relative permeability of the subsurface formation to the water, the viscosity of the solvent and the viscosity of the water.

One difficulty, however, in applying the method of water-solvent injection, particularly in tight formations, is that the rate at which the water-solvent mixture can be injected into the subsurface formation is limited. Thus, a number of costly injection wells are required to carry out the process or very high pressure injection pressures must be used requiring very expensive pumps and injection equipment designed for high pressures.

Accordingly, a method which increases the rate at which a water-solvent mixture can be injected into a subsurface formation would be highly desirable.

My new method provides the art with a method for treating the oil-containing formation in the vicinity of the injection well in such a manner that the injectivity or rate at which a water-solvent mixture can be injected is increased. Thus, a greater amount of water-solvent mixture can be injected at the same pressure conditions or the same amount of water-solvent mixture can be injected using smaller and less expensive pressure pumps and oil recovery equipment than formerly necessary.

Briefly described, my new method comprises first the injection of a water-solvent mixture down an injection well and into the oil-containing formations. The volume ratio of water to solvent is such that the rates of flow of the water and the solvent through the formation are substantially the same. Thereafter, a water-soluble gas is injected into the injection well to thereby displace substantially all the solvent in the water-solvent mixture from the vicinity of the injection well. Then, water is injected into the injection well and into the formation to dissolve the water-soluble gas.

As a result of the foregoing series of steps, the injectivity of the subsurface formation for the water-solvent mixture is substantially increased. Thereafter, the water-solvent mixture can be injected into the well at a substantially higher rate than previously obtainable or at substantially lower pressure to obtain the same rate as previously obtainable.

Figure 2:
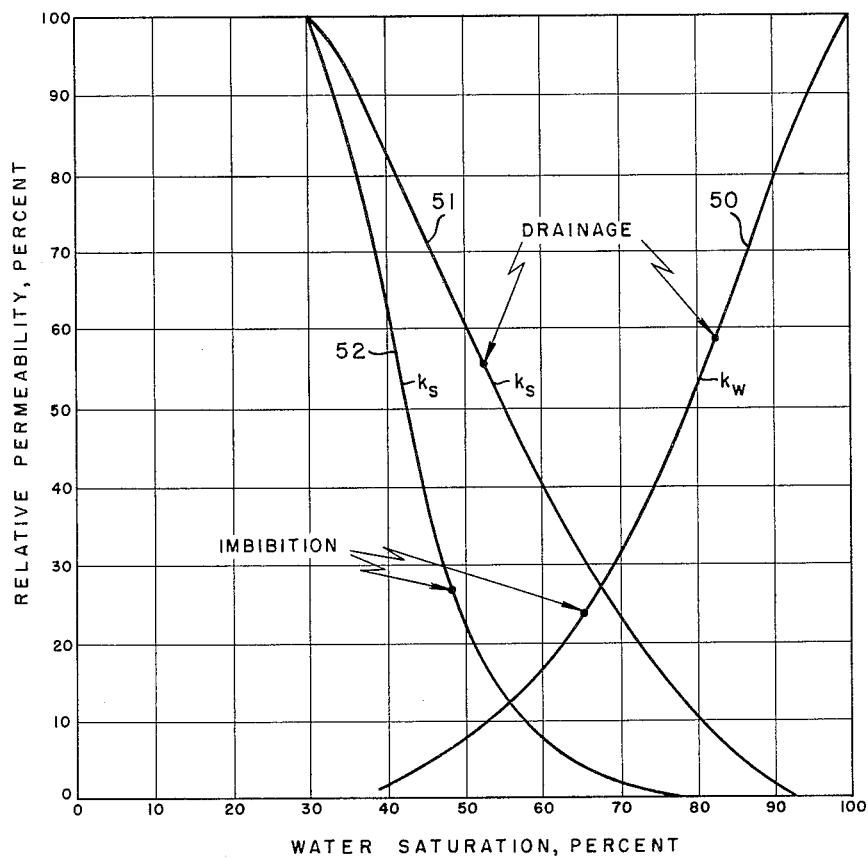
Figure 3:
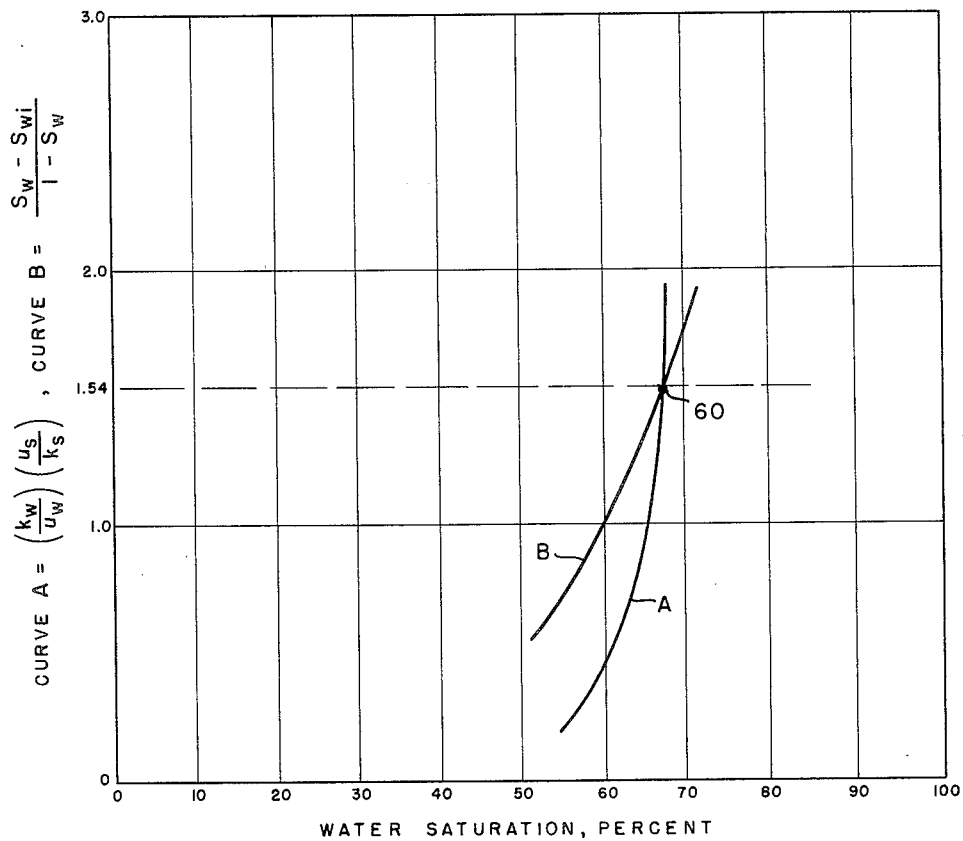

The invention as well as its many advantages will be further understood by reference to the following detailed description and drawings in which:

FIG. 1 is a section taken through an injection well and a production well illustrating one manner in which my invention can be used; and FIGS. 2 and 3 are graphical representations useful in explaining the advantages of my new method.

Referring specifically to FIG. 1, an injection well 10 and a production well 12 are shown spaced apart. The injection well 10 and production well 12 traverse a plurality of subsurface formations 14, 16, and 18. Formation 18 is illustrated as consisting of an oil-containing material such as oil-containing sand.

Injection well 10 has a casing 20 cemented to the sides of the borehole by means of cement 22. A tubing 24 extends from the earth's surface and through a packer 26. Materials which are injected into the oil-containing formation 18 can be flowed down the tubing 24 and into the oil-containing formation 18 through perforations 28 which have previously been formed through the casing 20 and cement 22 and extend into the oil-containing formation 18.

The production well 12 includes a casing 30 which has been cemented to the sides of the bore-hole by means of cement 32. A tubing 34 extends from the earth's surface through a packer 36 to a point adjacent the oil-containing formation 18. Oil may be produced through the perforations 38 formed through the casing 30 and cement 32. The oil thus flowed into the production well 12 is flowed upwardly through the tubing 34 and collected.

A single injection well 10 and a single producing well 12 are shown in the figure. However, it is to be understood that, if desired, a plurality of injection wells and a plurality of producing wells may be used in order to form a pattern of injection of the mixture and recovery of oil.

In normal water-solvent operations, the mixture is flowed down through tubing 24 in the injection well 10 and through the perforations 28. The mixture then flows into the pore spaces and any small fissures 40 which permeate through the oil-containing formation 18. The mixture thus displaces some of the oil in the oil-containing formation 18. The displaced oil flows through perforations 38 and up to the earth's surface through tubing 34 located in producing well 12.

When water displaces oil or gas contained in a subsurface formation, the relative permeability to oil or gas of the formation varies as a function of the water saturation in the formation. Also, if instead of the water displacing the oil or gas, oil is used to displace water, the relative permeability to oil of the subsurface formation varies as a function of the water saturation. The displacement of oil or gas by water is termed an "imbibition" condition, whereas the displacement of water by oil is termed a "drainage" condition.

The relative permeability of a formation to a solvent under "drainage" conditions is substantially higher than under "imbibition" conditions. However, using the water-solvent mixture displacement method, it has been found that the water-solvent mixture in displacing the residual oil contained in the oil-containing formation acts under "imbibition" conditions. Accordingly, if a method is used to change the conditions from an "imbibition" condition to a "drainage" condition, the injectivity or relative permeability of the formation to the mixture of the solvent and water can be substantially increased. My new method does this.

FIG. 2 is a graphical representation of relative permeability as a function of water saturation. The graph of FIG. 2 shows the relative permeability of the water and the solvent in a mixture for both the "imbibition" condition and the "drainage" condition. Under both conditions the relative permeability to water is substantially the same as indicated by the curve 50. However, the relative permeability of the formation to the solvent is higher under "drainage" conditions than under "imbibition" conditions as indicated by the curves 51 and 52, respectively.

In carrying out my new method, a particular volume ratio of water to solvent is injected down the injection well and into the oil-containing formation. As the water saturation is increased, the relative permeability to the solvent varies according to the curve 52 of FIG. 2. After the residual oil in the vicinity of the injection well has been displaced, the injection of the water-solvent mixture is terminated and a water-soluble gas, such as carbon dioxide, is then injected into the well to displace all of the solvent a certain distance, say 50 feet from the injection well. Since the viscosity of the water-soluble gas, such as $CO_2$, is similar to that of the solvent in the water-solvent mixture and since the water-soluble gas and the solvent in the water-solvent are miscible in all proportions, the water-soluble gas displaces substantially all of the solvent but very little of the water. Thus, after the injection of the water-soluble gas, the vicinity of the injection well, say 50 feet from the well, is highly saturated with water and water-soluble gas.

Thereafter, water alone is injected to dissolve the water-soluble gas such as the $CO_2$. This step of injecting the water alone to dissolve the $CO_2$ leaves the treated area in the vicinity of the injection well completely or substantially completely saturated with water.

Water-soluble gases, other than $CO_2$, which may be used include carbon monoxide, ammonia, chlorine, fluorine, sulfur dioxide, and sulfur trioxide.

Thereafter, the water-solvent mixture is injected into the well. The condition then obtained is a "drainage" condition. Thus, since the water saturation is very high, say at least between 80 and 90%, and the relative permeability of the formation to the solvent is along curve 51 of FIG. 2, it can be seen that the relative permeability to the formation for both water and solvent is substantially increased. This means that the mobility of the mixture is also substantially increased thus requiring the use of much lower pressure in injecting the water-solvent mixture than formerly required. As stated above, the cost of the method is then substantially decreased because the equipment necessary is smaller.

The volume ratio of water to solvent used is chosen such that the rate of flow of the water and the rate of flow of the solvent through the subsurface formation is substantially the same so that the fronts of the solvent and water progress at the same rate. The actual ratio depends upon various factors such as the permeability of the oil-containing formation, the relative permeability of the water, the relative permeability of the solvent, and the viscosity of the water and viscosity of the solvent, the water saturation, and the connate water saturation.

The ratio of the required water and solvent in the mixture is such that:

$$\text{Ratio} = \frac{q_w}{q_s} = \frac{\frac{k_w}{u_w}}{\frac{k_s}{u_s}} = \frac{S_w - S_{wi}}{1 - S_w}$$

where $k_w$ and $k_s$ are the relative permeability (imbibition) to water and solvent, $u_w$ and $u_s$ are the viscosities of the water and solvent, $S_w$ is the water saturation and $S_{wi}$ is the connate water saturation.

As an example, a test was made using subsurface formation material with a permeability of 1 darcy and a connate water saturation of 30%. The viscosity of the water and the viscosity of the solvent in the water-solvent mixture was such that $$\frac{u_w}{u_s} = 10$$

The relative permeability of the subsurface formation material $k_w$ to water and the relative permeability $k_s$ to the solvent (imbibition) followed a curve such as that shown in FIG. 2.

The ratio of water by volume to solvent by volume $q_w/q_s$ can be obtained by reference to FIG. 2 in conjunction with FIG. 3. FIG. 3 shows a curve A representing $$\left(\frac{k_w}{u_w}\right)\left(\frac{u_s}{k_s}\right)$$

as a function of water saturation. Curve B shows the values of $$\frac{S_w - S_{wi}}{1 - S_w}$$

as a function of water saturation. In curve A of FIG. 3, $$\frac{u_s}{u_w} = \frac{1}{10}$$

and $k_w$ and $k_s$ are taken from curve 50 and curve 52 for the particular water saturation values of FIG. 2. In obtaining curve B of FIG. 3, the connate water saturation $S_{wi}$ was 30%.

The value of curve A and the value of curve B are equal at the point where they meet, which is point 60 of FIG. 3. This amounts to a volume ratio of water to solvent of about 1.15. This occurs at a water saturation of about 67.5%.

Thus, in this particular test, a mixture was injected having 1.15 ratio. The mobility of the mixture is given by $$\frac{k_w}{u_w} + \frac{k_s}{u_s} = 1.54$$

for this sample having a permeability of 1 darcy, then looking at FIG. 2 and obtaining values from curves 50 and 52 at 67.5% water saturation. The solvent-water injection was ceased and enough carbon dioxide injected to displace all the solvent to, say, up to 50 feet. About 2000 cubic feet of gas at reservoir conditions is needed to treat each foot of a formation of normal porosity for a distance of 50 feet from the well bore. Then water alone was injected to dissolve the carbon dioxide. On resumption of the injection of the water and solvent mixture with the same 1.15 ratio, the "drainage" relative permeability data applied. The water saturation was around 85%. Thus, at 85% water saturation, the mobility of the mixture was increased from 1.54 to 3.53. Thus, for the same injection rate, the pressure gradients around the well were only 44% of those originally existing. This means that the "injectivity" or easiness with which the water-solvent mixture can be introduced into the well was increased considerably.

I claim:

1. A method of improving the injectivity of a water-solvent mixture into an oil-containing formation comprising the steps of: injecting a mixture of water and a solvent, said solvent being a hydrocarbon having from 1 to 4 carbon atoms down an injection well and into the oil-containing formation with a volume ratio of water to solvent such that the rates of flow of the water and the solvent through said formation are substantially the same; then injecting water-soluble gas into the injection well to thereby displace substantially all of the solvent in the water-solvent mixture from the vicinity of the injection well; and then injecting water into the injection well and into said formation to dissolve the water-soluble gas whereby the injectivity of the formation in the vicinity of the injection well to a water-solvent mixture is substantially increased.

2. A method in accordance with claim 1 wherein the water-soluble gas is carbon dioxide.

References Cited in the file of this patent

UNITED STATES PATENTS 2,875,831 Martin et al. _____ Mar. 3, 1959
2,875,833 Martin _____ Mar. 3, 1959
2,897,894 Draper et al. _____ Aug. 4, 1959

OTHER REFERENCES

"Orco Pins Hopes on Carbonated Flood," The Oil and Gas Journal, September 2, 1957, pages 88 and 89.